3,375,220
POLYURETHANE PRODUCT

Charles C. Clark, Kenmore, and Herbert M. Schroeder, Williamsville, N.Y., and Lloyd R. Garrison, Trenton, Mich., assignors to Textron Inc., a corporation of Rhode Island
No Drawing. Filed Aug. 9, 1965, Ser. No. 478,445
20 Claims. (Cl. 260—45.7)

ABSTRACT OF THE DISCLOSURE

A polyurethane fire-retardant coating composition consisting essentially of the reaction product of aromatic hydrocarbon diisocyanate and nitropolyhydric alkanol; the composition contains tris(haloalkyl)phosphate to improve the fire-retardant properties.

---

This invention relates to fire-retardant coating compositions. More particularly, the present invention is concerned with fire retardant coating compositions made by reaction of an aromatic diisocyanate and a nitro-substituted polyhydric alkanol and included in the composition, either by reaction or by blending, is a haloalkyl phosphate. Additional polyhydroxyl materials may also form a part of the reaction product with the diisocyanate. Coatings produced from the compositions of this invention are moisture-curing due to the presence of isocyanate groups and the coating is especially distinguished by its intumescent properties.

The importance of imparting fire retardant characteristics to building materials and other substrates of the flammable type is widely recognized. By and large it is not practical, even if possible, to make flammable building materials completely fire resistant. However, it is very desirable to give to such materials sufficient fire-retardant properties to delay the spread of fire to allow the escape of occupants from burning structures and to give time for firemen to arrive on the scene to take action before the structure is consumed and the fire transferred to nearby buildings and equipment. A most convenient manner of imparting such characteristics to the building materials is to coat them with a liquid which will cure or dry to a more or less hard film in the presence of the moisture in the atmosphere. These coating materials often have as a principal ingredient a base which is referred to as a moisture-curing vehicle. Such products are applied to plywood and other types of panelling and combustible materials used in forming walls and other structures in commercial and domestic buildings.

There are several ways in which the fire-retardant properties of building materials may be evaluated. There has been adopted a test procedure designated ASTM E-84 in ASTM Standards 1961, part 5, p. 1178, Surface Burning Characteristics of Building Materials. This test serves to classify building materials as to their burning characteristics and to provide data regarding (1) flame spread; (2) fuel contributed; and (3) density of smoke developed during exposure to fire. The material tested is given a comparative rating with the properties of red oak serving to indicate a value of 100 in all three of the categories while asbestos-cement board is assigned a 0 rating in each instance. This test is very severe and there is great difficulty in providing sufficient resistance to burning with respect to the wide variety of building materials, especially if the cost is to be kept within practical limits and the other desirable properties of the materials are not to be unduly deleteriously affected.

Another procedure for evaluating the fire-retardant properties of building materials can be readily applied in the ordinary laboratory. This operation employs a small metal cabinet described in ASTM D1360 found in ASTM, part 21, January 1965, Fire Retardancy of Paints (Cabinet Method), the cabinet having a glass door for observing burning in the cabinet. The cabinet also has holes around its bottom for air draft with a chimney serving as a smoke outlet. A 12″ x 6″ x ¼″ wood panel, for instance, poplar, or even birch plywood for a more rigorous test, is covered with the coating to be tested and then the coating is allowed to dry or cure for at least about 2 days. Two or three coats may be applied and three coats give good film thickness for an adequate determination of fire retardance and intumescence. The coated panel is placed on a metal frame at a 45° angle in the test cabinet. A measured amount of ethanol, for instance, 1 cc. or even 5 cc. for a more severe test, is placed in a small iron cup below the panel, so that when the ethanol is burned the flame impinges against the under side of the panel. In the test the ethanol is ignited and allowed to burn out and the degree of burning of the panel and amount of intumescence are observed during burning and also when burning is finished.

The present invention provides a normally liquid, moisture curing coating material or vehicle which when applied to a flammable building material or other combustible substrate, especially wood, imparts thereto outstanding resistance to burning in terms of flame spread and fuel contributed. The coatings have these properties as a result of a selection of the ingredients of the vehicle which also serve at least in substantial part to provide desirable fire retardant properties through intumescent action. Thus our compositions are made by reaction of an aromatic hydrocarbon diisocyanate and a nitro-substituted polyhydric alkanol and included in the composition, either by reaction or by blending, is a haloalkyl phosphate. Additional polyhydroxy materials may also form a part of the reaction product with the diisocyanate. The compositions of the present invention not only exhibit intumescence, but in addition, they do not contribute to burning, rather they serve to prevent the spread of flames and in effect extinguish the burning of the substrate.

One ingredient of the coating composition of the present invention is an aromatic hydrocarbon diisocyanate and one or more of a variety of diisocyanates may be employed. The aromatic diisocyanates have the isocyanate groups attached to one or two aromatic rings. The isocyanates may be substituted with non-interfering groups, such as aliphatic hydrocarbon radicals, e.g., lower alkyl groups. Suitable diisocyanates include 2,6-tolylene diisocyanate, 2,4-tolylene diisocyanate, p-phenylene diisocyanate, p,p'-diphenylmethane diisocyanate, 1,5-naphthylene diisocyanate, substituted aromatic diisocyanates, etc. The hydrocarbon portion of the diisocyanate has at least about 6 carbon atoms and usually does not have more than about 24 carbon atoms. Aromatic diisocyanates of 6 to 12 carbon atoms in the hydrocarbon group are preferred. The amount of diisocyanate component employed is such as to give a ratio of isocyanate groups to hydroxyl radicals in the reaction mixture of about 1.5 to 2.5:1, preferably about 1.8 to 2.2:1, based on the total of the diisocyanate, nitropolyhydric alkanol and other polyol, if any of the latter be present. The reaction mixture contains an excess of isocyanate groups sufficient to provide a moisture-curing vehicle. The isocyanate groups in the vehicle, aside from any unreacted diisocyanate present, are generally at least about 0.1 weight percent of the composition, e.g., up to about 20% with about 2 to 15% being preferred.

The second essential component of the fire-retardant and intumescent coating composition of the present invention is a nitro-substituted polyhydric alkanol, including cycloalkanols. Often these materials are dihydric or trihydric but they may contain more than three hydroxyl groups. Also, we prefer to employ alkanols with a single nitro group but they may have two or more of such radicals. The lower molecular weight nitroalkanols are used most advantageously and these may often be lower aliphatic, including cycloaliphatic structures, for instance of 1 to about 12 carbon atoms, preferably 1 to about 6 carbon atoms. Mixtures of the nitroalkanols may also be employed, for instance the weight ratio of dihydric nitroalkanol to trihydric nitroalkanol may be about 1 to 3:1, and we especially employ such materials in approximately equal equivalent (OH basis) amounts. Representative nitro-substituted polyhydric alkanols include tris(hydroxymethyl)nitromethane, 2-nitro-2-methyl-1,3-propanediol, 2-nitro-2-ethyl-1,3-propanediol, etc.

The nitro-substituted polyhydric alkanol may be the only hydroxyl-supplying material reacted with the diisocyanate, but alternatively another dissimilar polyhydroxyl material may form part of the reaction mixture. The nitroalkanol in general provides at least about 40% of the reactive polyol-derived hydroxy groups. Thus the other polyol may not be present at all or may in general supply up to about 60% of the reactive polyol-derived hydroxyl groups. When the latter polyol is present it will often afford up to about 25% of the reactive polyol-derived hydroxyl groups, preferably about 1 to 10%. This polyol may be selected from a wide variety of polyhydroxyl materials which may be aliphatic, including cycloaliphatic, aromatic or mixed aliphatic-aromatic hydrocarbon compounds, including substituted hydrocarbon compounds. Thus this polyol may be alkyl, alkenyl, aryl, alkaryl, arylalkyl, etc., and will often have a molecular weight up to about 3000, but preferably has up to about 12 carbon atoms. As indicated the polyol may be substituted with non-hydroxy groups but in order for this member to be dissimilar to the nitroalkanol, the substituent on the polyol, if present, is other than nitro when the polyol is an alkanol of the class forming the essential nitro-substituted polyhydric alkanol reactant of this invention. Representative polyol classes and individual compounds are given below.

The polyol employed may be a phenoxy ether diol, preferably a polyhalo-substituted phenoxy ether diol. These preferred materials can be made, for example, from chlorodihydroxy alkanols through reaction with a suitable sodium polyhalophenate. The phenoxy ether diols can be represented by the formula:

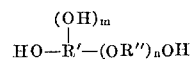

in which X is halogen having an atomic number from 17 to 35, that is, chlorine or bromine and $n$ is a number from 0 to 5, preferably 2 or even 3 to 5. Also in the formula, R is a divalent alkyl, including cycloalkyl, radical of 3 to 12 carbon atoms, preferably 3 to 6 carbon atoms. The preferred polyhalophenoxy ether diol is pentachlorophenoxy glyceryl ether which has the structure

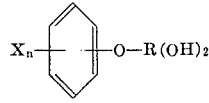

however, other suitable and similar materials may be employed. The phenyl group of these compounds may be substituted, e.g., with lower alkyl groups, and the compounds may also contain other non-interfering substituents. It is preferred that the two illustrated hydroxy groups of this reactant be attached to separate secondary and primary carbon atoms. Also the alkyl radical R may have its carbon-to-carbon chain interrupted as with one or more oxygen atoms. Representative reagents of this type include, for instance, phenoxyglyceryl ether, 2,4,6-trichlorophenoxy glyceryl ether, 1-tetrabromotoloxy-3,4-dihydroxybutane, 1-pentachlorophenoxy-2,6-dihydroxyhexane, etc.

Another polyol reactant which can be employed in making the polyurethane-type reaction products of the present invention is an aliphatic polyol or polyhydric alkanol. This alcohol often has at least 2 carbon atoms, and among the wide variety of such materials which can be used are those represented by the formula:

$$\text{HO}-\underset{\underset{\text{(OH)}_m}{|}}{\text{R}'}-(\text{OR}'')_n\text{OH}$$

in which R′ is an aliphatic hydrocarbon radical, preferably saturated, and R″ is an alkylene radical of 2 to 4, preferably 2 to 3 carbon atoms, R′ generally has 2 to 12, preferably 2 to 6 carbon atoms. The letter $n$ represents a number from 0 to about 50, preferably 2 to 30 for more flexible coatings, while the letter $m$ is 0 to 1, preferably 0. When $n$ is other than a zero, R′ will often be the same as R″. The aliphatic polyol reactant can be substituted with non-deleterious substituents and the lower molecular weight polyether glycols, e.g., of 2 to 4 ethylene oxide units, are preferred reactant materials.

The amounts of phenoxy diol and aliphatic polyol in the reaction product, when both are use, are usually such as to give a weight ratio of these ingredients of about 1:10 to 10:1, but of course only one of these ingredients may be employed and either one may be present in very small amounts. Often these ratios are about 1:3 to 3:1, with ratios of the phenoxy diol to the aliphatic polyol of about 1.5 to 3:1 being a preferred form. Approximately equal molar ratios of these ingredients are also advantageous.

Suitable aliphatic polyols include ethylene glycol, polyethylene glycols, for instance, of up to about 2000 molecular weight, propylene glycol, polypropylene glycols, for instance, of up to about 2500 molecular weight, trimethylol propane, trimethylol ethane, 1,6-hexamethylene glycol, 1,2,6-hexanetriol, etc. The aliphatic polyols of essentially dihydroxy functionality, i.e. where $m$ is 0, are preferred. Moreover, it is further preferred that the diol bear essentially no active hydrogen atoms other than those of the two hydroxyl groups.

When making the fire-resistant and intumescent coating materials of this invention, it may be desirable to employ polyols which are phosphorus esters. Thus the reactant employed in making the polyurethane-type reaction product may be a polyhydroxy aliphatic ester of phosphorus, e.g., the phosphates and phosphonates. The total number of carbon atoms in the three aliphatic groups of the ester is at least 3 and often does not exceed about 24, preferably not more than 18 with no one aliphatic group containing more than about 8 carbon atoms. The aliphatic radicals are often saturated and may be substituted, even with elements such as nitrogen and oxygen that interrupt the carbon chain. The polyol phosphorus esters may contain more than two hydroxy groups but the diols are preferred.

Among the polyol esters of phosphorus which are useful in our invention are the phosphates and phosphonates of the formula:

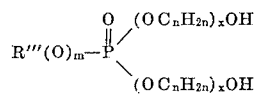

wherein $m$ is 0 or 1, $n$ is 2 to 6, especially 2 to 3, $x$ is 1 to 10, preferably 1 to 3, and R‴ is a hydrocarbon radical, for instance of 1 to 8 carbon atoms, and may be aliphatic, including cycloaliphatic, aromatic or mixed aromatic-aliphatic, and is preferably lower alkyl. R‴ may be saturated or unsaturated and substituted but is dissimilar to the haloalkyl phosphate component of our compositions. Illustrative of these materials are di(trioxypropylene)-methyl phosphonate

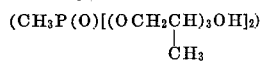
(CH₃P(O)[(OCH₂CH)₃OH]₂)
|
CH₃ di[oxypropylene]butyl phosphate

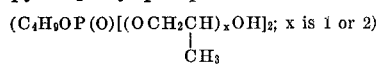
(C₄H₉OP(O)[(OCH₂CH)ₓOH]₂; x is 1 or 2)
|
CH₃ di[trioxyethylene]hydroxymethyl phosphonate

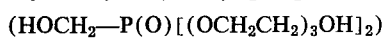
(HOCH₂—P(O)[(OCH₂CH₂)₃OH]₂)

etc.

Diol phosphorus esters having one or more nitrogen atoms interrupting the carbon to carbon chain extending directly between terminal CH₂OH groups, can also be employed in this invention as the dissimilar polyol in providing the fire-resistant and intumescent coatings. Thus, the diol may have the formula:

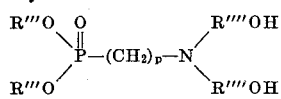

wherein $p$ is 1 to 4, $R'''$ is as defined in the immediately preceding paragraph, and $R''''$ is a divalent radical of the same types as disclosed for $R'''$, preferably lower alkylene, but with the OH groups shown. Compounds which exemplify this type of diol include O,O-diethyl-N,N-bis(2-hydroxyethyl)aminomethyl phosphonate,

$(C_2H_5O)_2P(O)CH_2N(C_2H_4OH)_2$

The normally liquid polyurethane-type reaction product of the present invention can be made by simultaneous reaction of the diisocyanate, nitro-substituted polyhydric alkanol, and dissimilar polyol, if present. Alternatively, the diisocyanate can be reacted with part of one or both or all of one of the nitro alkanol and dissimilar polyol prior to reaction with the remaining portion of these materials. Stepwise mixing of the diisocyanate with the nitro alkanol and the other polyol is preferred to enhance temperature control. Although the halo alkyl phosphate component can merely be blended with the diisocyanate-nitroalkanol-polyol reaction product, the phosphate may also be present during the reaction and thus may be part of the reaction product. The reaction temperatures are often in the range of about 40 to 130° C., with about 50 to 100° C. being preferred; and the reaction is preferably continued until there is essentially little, if any, unreacted hydroxyl functionality remaining.

The reaction product of the present invention is commonly prepared in the presence of an essentially inert solvent. The solvent serves to insure that the reactants are in the liquid state and the solvent enables better temperature control during the reaction by serving as a heat sink and, if desired, as a refluxing medium. Various solvents including mixtures of such materials may be employed and among the useful solvents are aromatic hydrocarbons, esters, ethers, ester-ketones, chlorinated hydrocarbons, etc. Frequently, the solvents are volatile materials which will be removed from the composition while it cures as a coating or film and in such case, there may be no need to remove any portion of the solvent from the reaction product prior to application as a coating. The solvent may be a relatively non-volatile material and may be selected with a view to improving the fire-retardant properties of the coating, for instance, when chlorinated hydrocarbons are used. If the solvent is to be removed from the reaction product before it is applied as a film, the removal should be done in the absence of significant moisture, since moisture causes curing of the composition. The amount of solvent employed may vary widely and large volumes may be uneconomic or give materials with undesirably or inconveniently low viscosity. The amount of solvent may be selected in order to provide a reaction product of film application viscosity, but products of greater viscosity can be cut-back before use. Often we use about 0.25 to 6 weights of solvent, preferably about 0.5 to 3 weights of solvent, per weight of the total isocyanate, nitroalkanol and dissimilar polyol. Among the suitable normally liquid solvents are xylene, ethylene glycol ethyl ether acetate, 1,1,1-trichloroethane, dimethylformamide, dimethylsulfone, dioxane, etc. and their mixtures; and we prefer that the solvent not contain more than about 10 carbon atoms per molecule.

As noted previously, the fire-retardant and intumescent characteristics of the reaction product depend to great extent on the use of the nitro-substituted polyhydric alkanol and the presence of a haloalkyl phosphate, preferably a tris(haloalkyl)phosphate. The halogen component of the phosphate has an atomic number from 17 to 35, that is chlorine or bromine, and preferably the alkyl is monohalo-substituted. Chlorine is the preferred halogen. The alkyl, including cycloalkyl, groups are preferably lower alkyl radicals and in general, alkyls of a lesser number of carbon atoms, e.g. 2 to 4 are preferred, as they have lower fuel and smoke potential. One or more of the alkyl radicals may be substituted with materials other than halogens and may have an interrupted carbon chain. The amount of haloalkyl phosphate in the composition is sufficient to have the desired effect and is often about 20 to 60, preferably about 25 to 50 weight percent on the basis of the diisocyanate, nitroalkanol, dissimilar polyol and the haloalkyl phosphate. If desired, the phosphate can be added to the composition before or after reaction of the diisocyanate, nitroalkanol and dissimilar polyol, but preferably the addition is after the reaction.

The fire retardant and intumescent characteristics of the halolalkyl phosphate-containing coating composition of the present invention may be enhanced by including an effective amount of a lower alkylene diamine tetraacetic acid. The alkylene members may have 2 to 4 carbon atoms, and we prefer to use ethylene diamine tetraacetic acid. In general, the coating composition will contain about 20 to 60 weight percent of the alkylene diamine tetraacetic acid, preferably the amount is about 25 to 50 weight percent, on the basis of the polymer composed of diisocyanate, nitroalkanol and dissimilar polyol, and the alkylene diamine tetraacetic acid.

The diamine may not be soluble in the coating composition to the extent of diamine present and it is therefore desirable to add the diamine as a finely divided material and disperse it throughout the composition. The compositions of the present invention which contain water-soluble forms of the lower alkylene tetraacetic acid, for instance, ethylene diamine tetracetic acid when applied as coatings may be sensitive to water contact as would occur during washing or use in a humid atmosphere. To counteract this possible difficulty, we prefer that the flammable substrate for the coating be covered with the fire resistant and intumescent composition which contains both the halogenated alkyl phosphate and the lower alkylene diamine tetraacetic acid and then cover such film with a similar coating material in which the latter component is omitted. The resulting films are resistant to water leaching and show good hardness and excellent fire retardance and intumescence.

Our coating compositions are normally applied to substrates as films of less than 10 mils thickness and can contain other additives to impart special properties such as plasticizers, etc. Also, the substrate for the coating may be specially treated materials, including flammable members impregnated with fire-resistant chemicals or coated with a sealant.

The following examples will serve to illustrate the present invention but should not be considered limiting.

*Example 1*

2,4-tolylene diisocyanate (870 grams, 10 equivalents) was charged to a reaction flask provided with a reflux condenser, water trap, thermometer, glass mantel heater and stirrer. Cellosolve acetate (ethyl ether of ethylene glycol acetate) (374 grams) and 374 grams xylene were also added. Two hundred fifty two grams (5 equivalents) of tris(hydroxymethyl)nitromethane were aded to the mixture in the flask while stirring. The temperature during 2 hours reached 60° C. when it was reduced to 45° C. and kept at this point overnight (about 16 hours). At the end of this time some of the tris(hydroxymethyl) nitromethane was not dissolved. Temperature was raised to 60° C. and after 7½ hours at this point the percent NCO was 23.92. After another hour 1.1 grams of dibutyl tin dilaurate was added. The temperature rose in 45 seconds to 132° C. The mixture was then cooled to 45° C. Temperature was kept at 40° C. for another 16 hours when the percent NCO was 12.78. Temperature was then raised to and kept at 60° C. for another 5 hours, when the percent NCO was 12.02, the Gardner viscosity J, the total solids 63.7 and the free TDI 9.72. This vehicle dried to a mar free condition in 3 hours on glass. One-third of the weight of the solids of this vehicle as tris(2-chloroethyl)phosphate was dissolved in it. The fire retardancy and intumescence of this vehicle were greatly improved over those of a vehicle made by a similar procedure but containing tris(hydroxymethyl)aminomethane in place of tris(hydroxymethyl)nitromethane.

Example 2

Fifty grams (1 equivalent of tris(hydroxymethyl)nitromethane, 74.6 grams (1 equivalent) of 2-nitro-2-ethyl-1,3-propanediol, 127 grams of Cellosolve acetate (ethylene glycol ethyl ether acetate) and 127 grams of xylene were charged to a reaction flask provided with a thermometer, stirrer, inlet for nitrogen, reflux condenser, water trap and electric mantel heater. Water was removed from this mixture by heating until it ceased collecting in the water trap. This required one hour with the temperature at 90° C. The temperature was then allowed to drop to 50° C. when 348 grams (4 equivalents) of tolylene diisocyanate (80 percent 2,4-isomer, 20 percent 2,6-isomer) were added along with 0.5 gram of dibutyl tin dilaurate. The temperature was maintained at about 80° C. for 65 minutes and the mixture was cooled to 27° C. At this point the percent NCO was 11.44, the Gardner viscosity V, the Gardner color 6 and total solids 65 percent. Tris-(2-chloroethyl)phosphate was mixed with this vehicle at the rate of one part to two parts of the vehicle solids. This product showed good intumescence when burned as a coating on wood.

Example 3

Four hundred six grams (6 equivalents) of 2-nitro-2-methyl-1,3-propanediol, 300 grams (6 equivalents) of tris(hydroxymethyl)nitromethane, 930 grams ethylene glycol ethyl ether acetate (Cellosolve acetate) and 930 grams of xylene were charged to a reaction flask which has a thermometer, reflux condenser, stirrer, water trap, glass mantel heater and inlet for gaseous nitrogen. This mixture was heated for one hour at 95° C. and water was removed by azeotroping with xylene. The dried mixture was cooled to 34° C. by means of a Dry Ice bath and 2090 grams of tolylene diisocyanate (80 percent 2,4 and 20 percent 2,6-isomers) were added. Three grams of dibutyl tin dilaurate (0.1 percent based on solids) were also added as a catalyst for the reaction. After 4 minutes the temperature had risen to 114° C. After one hour and 38 minutes more the temperature was 66° C. Gardner color was 1 minus, Gardner viscosity L, percent NCO 10.7, percent solids 64.6 and specific gravity 1.1416. This product was blended with one part by weight of tris(2-chloroethyl)phosphate to two parts of the solids of the product. This vehicle dried in 3 hours and had a Sward hardness of 62 after 7 days. Its viscosity was B at 46 percent solids. A 5.5 mil dry film exhibited good intumescence on wood. Its gloss and flexibility were excellent. This vehicle was coated on unprimed Douglas fir flooring as a 6 mil dry film. The test piece was 25 feet long, 20 inches wide and ¾ inch thick. This was tested according to ASTM E-84 and the results of this test were 40 flame spread, 30 fuel contributed and 135 smoke developed. Unprimed Douglas fir shows a flame spread of 110 in this test.

Example 4

Two hundred twenty-five grams of 55.5 percent pentachlorophenoxy glyceryl ether in xylene or 0.67 equivalent, 46 grams (0.68 equivalent) of 2-nitro-2-methyl-1,3-propane diol, 53 grams of ethylene glycol ethyl ether acetate and 125 grams of xylene were charged to a flask which had a thermometer, stirrer, reflux condenser, water trap, glass mantel heater and nitrogen inlet. This mixture was azeotroped for two hours in order to remove water and dry the system. After all of the water had been removed, the batch was cooled to room temperature and 235 grams (2.7 equivalents) of tolylene diisocyanate were added. The temperature rose rapidly to 88° C. due to heat liberated by the reaction to form polyurethane. The temperature of the batch was held at about 100° C. for 50 minutes, then allowed to fall to room temperature. This vehicle analyzed 74.9 percent nonvolatile, 5.11 percent NCO, 1.03 free tolylene diisocyanate, greater than Z10 viscosity and 12 minus Gardner color.

The vehicle was diluted to 60 nonvolatile before evaluating it. One form of it included one percent N-cocomorpholine based on vehicle solids along with ½ part by weight of tris(2-chloroethyl)phosphate per part of vehicle solids. This vehicle dried in 2 hours on a Morest chart to a film possessing good flexibility and a Sward hardness of 46.

When ½ part by weight of ethylene diamine tetraacetic acid per part of vehicle solids was stirred into the latter vehicle and the resultant vehicle coated on a Morest chart, it dried to a fairly flexible film in 3 hours. This film had a Sward hardness of 20.

The film containing the phosphate ester showed fair fire retardance and intumescence. The film containing the phosphate ester and the ethylene diamine tetraacetic acid showed good fire retardance and intumescence.

Example 5

Tris(hydroxymethyl)nitromethane (151.2 grams, 3 equivalents), polypropylene glycol 425 (33.6 grams, 0.153 equivalents), Cellosolve acetate (ethylene glycol ethyl ether acetate (226 grams), tris(2-chloroethyl)phosphate (366 grams) and xylene (226 grams) were charged to a two liter glass reaction flask which has a stirrer, an inlet for nitrogen, a reflux condenser, a water trap, a thermometer and a heating mantel. This mixture was heated under azeotroping conditions until water stopped distilling into the water trap. This dried mixture was then transferred to a reaction vessel similar to the above and containing 547.5 grams (6.15 equivalents) of 2,4-tolylene diisocyanate having dissolved therein 0.5 gram of dibutyl tin dilaurate, the temperature being 31° C. during this transfer. After stirring for one-half hour the temperature from the exotherm was 60° C. Heat was then applied until the batch temperature was 90° C. where it was kept for one and one-half hours.

The theoretical value for percent NCO is 8.29. The value found for percent NCO was 10.43. The non-volatile content of this vehicle was 64.8 and the percent free tolylene diisocyanate was 3.03.

The vehicle was brushed onto 12″ x 6″ x 0.5″ boards at about 6 mils dry film thickness. After curing for several days the film was subjected to the ASTM D1360 cabinet burning test. The fire retardancy and intumescence of this film were good.

Example 6

One hundred grams (2 equivalents) of tris(hydroxymethyl)nitromethane, 50.4 grams (0.396 equivalent) of $(EtO)_2P(O)CH_2N(C_2H_4OH)_2$, 283.6 grams tris(2-chloroethyl)phosphate, 165 grams Cellosolve acetate and 165 grams of xylene were charged to a flask equipped with a stirrer, a reflux condenser, a water trap, a thermometer, an inlet for inert gas and a heating mantel. This mixture was heated until water ceased collecting in the water trap, a procedure requiring approximately one hour. This dry mixture was added over a 15 minute period to 416 grams (4.79 equivalents) of 2,4-tolylene diisocyanate (Mondur TDS) in which was dissolved 0.5 gram of dibutyl tin dilaurate as a curing catalyst. The temperature of the reaction mixture rose to 65° C. from the exothermic heat of reaction. A cooling mixture was applied at 65° C. in order to prevent the temperature of reaction from rising above this point. The total reaction time was four hours. After cooling to room temperature the viscosity of the vehicle was A, the nonvolatile content 67.8 percent and the percent free tolylene diisocyanate 2.71. This vehicle was brushed onto 12″ x 6″ x 0.25″ birch plywood boards at 6 mils dry film and allowed to cure for several days. When these films were subjected to the ASTM D1360 cabinet burning test, the intumescence produced and the fire retardancy were excellent.

*Example 7*

One hundred grams (2 equivalents) of tris(hydroxymethyl)nitromethane, 25 grams (0.132 equivalent) of $$C_4H_9OP(O)[(OCH_2CH)_xOH]_2$$
$$\qquad\qquad\qquad\;\; |$$
$$\qquad\qquad\qquad\; CH_3$$

$x=1$ or 2, 248.4 grams tris(2-chloroethyl)phosphate, 157.5 grams Cellosolve acetate and 157.5 grams of xylene were charged to a glass flask provided with a stirrer, thermometer, heating mantel, water trap, reflux condenser and inlet for nitrogen. This mixture was heated under azeotroping conditions until water no longer collected in the water trap. Another reaction flask similar to that described above was set up. Three hundred seventy-one grams (4.264 equivalents) of 2,4-tolylene diisocyanate and 0.5 gram of dibutyl tin dilaurate were charged to this flask. The dry mixture of hydroxyl containing compounds was then added during 15 minutes to the diisocyanate with the temperature at 45° C. Heat of reaction caused the temperature to rise to 87° C. when a cooling mixture was applied to the reaction flask to lower the temperature to about 35° C. The total reaction time was four hours. The product was transferred to cans for storage and analysis. The viscosity of this product was B, non-volatile 65.7 percent and the percent free tolylene diisocyanate was 2.62. This vehicle was brushed onto 12″ x 6″ x 0.25″ plywood boards at 6 mils dry film and cured at room temperature for several days. When panels coated in this manner were tested by the ASTM D1360 cabinet burning method, the intumescence produced and the first retardancy were excellent.

We claim:

1. A normally liquid, moisture-curing polyurethane composition consisting essentially of the reaction product of aromatic hydrocarbon diisocyanate and nitropolyhydric alkanol of up to about 12 carbon atoms, the amounts of said diisocyanate, and nitro polyhydric alkanol being such as to give a ratio of isocyanate to hydroxyl groups in the reaction mixture of about 1.5 to 2.5:1, said composition containing an amount sufficient to improve the fire-retardant properties of a coating of said composition of tris(haloalkyl)phosphate in which the halogen has an atomic number from 17 to 35.

2. The composition of claim 1 in which the tris(haloalkyl)phosphate is a tris(halogen lower alkyl)phosphate.

3. The composition of claim 2 in which the halogen lower lakyl is monochloroalkyl of 2 to 3 carbon atoms.

4. The composition of claim 3 in which the amount of halogen lower alkyl phosphate is about 25 to 50 weight percent based on the reaction product and the halogen lower alkyl phosphate.

5. The composition of claim 1 in which the nitropolyhydric alkanol is tris(hydroxymethyl)nitromethane.

6. The composition of claim 1 in which the nitropolyhydric alkanol is a mononitrodiol.

7. The composition of claim 2 in which the nitropolyhydric alkanol is tris(hydroxymethyl)nitromethane.

8. The composition of claim 2 in which the nitropolyhydric alkanol is a mixture of tris(hydroxymethyl)nitromethane and a member selected from the group consisting of 2-nitro-2-methyl-1,3-propane diol and 2-nitro-2-ethyl-1,3-propane diol.

9. The composition of claim 7 in which the tris(haloalkyl)phosphate is tris(chloroethyl)phosphate and the diisocyanate is tolylene diisocyanate.

10. The composition of claim 1 in which the diisocyanate is tolylene diisocyanate.

11. A normally liquid, moisture-curing polyurethane composition consisting essentially of the reaction product of aromatic hydrocarbon diisocyanate, nitropolyhydric alkanol of up to about 12 carbon atoms, and polyhydric alcohol dissimilar to said nitropolyhydric alcohol and having a molecular weight of up to about 3000, the amounts of said diisocyanate, nitropolyhydric alkanol and dissimilar polyhydric alcohol being such to give a ratio of isocyanate to hydroxyl groups in the reaction mixture of about 1.5 to 2.5:1, with the nitropolyhydric alkanol supplying at least about 40% of the hydroxyl groups, said composition containing an amount sufficient to improve the fire-retardant properties of a coating of said composition of tris(haloalkyl)phosphate in which the halogen has an atomic number from 17 to 35.

12. The composition of claim 11 in which the nitropolyhydric alkanol supplied at least about 90% of said hydroxy groups.

13. The composition of claim 11 in which the diisocyanate is tolylene diisocyanate.

14. The composition of claim 13 in which the nitropolyhydric alcohol is tris(hydroxymethyl)nitromethane.

15. The composition of claim 11 in which the dissimilar polyhydric alcohol is selected from the group consisting of ether diol of the formula:

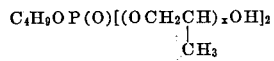

in which the two hydroxy groups are attached to separate secondary and primary carbon atoms, and in which $n$ is a number from 3 to 5 and R is alkyl of 3 to 6 carbon atoms; polypropylene glycol of up to 2500 molecular weight;

$$R'''(O)_m - P \begin{matrix} O \\ \| \\ \end{matrix} \begin{matrix} (OC_nH_{2n})_xOH \\ \\ (OC_nH_{2n})_xOH \end{matrix}$$

wherein $m$ is 0 to 1, $n$ is 2 to 6, $x$ is 1 to 10 and $R'''$ is lower alkyl; and $$\begin{matrix} R'''-O & O & R''''OH \\ & \diagdown \| & \diagup \\ & P-(CH_2)_p-N \\ & \diagup & \diagdown \\ R'''-O & & R''''OH \end{matrix}$$

wherein $p$ is 1 to 4, $R'''$ is lower alkyl and $R''''$ is lower alkylene.

16. The composition of claim 15 in which the diisocyanate is tolylene diisocyanate and the nitropolyhydroxy alkanol is tris(hydroxymethyl)nitromethane.

17. The composition of claim 16 in which the tris(haloalkyl)phosphate is a tris(halogen lower alkyl)phosphate.

18. The composition of claim 17 in which the halogen lower alkyl is monochloroalkyl of 2 to 3 carbon atoms.

19. The composition of claim 18 in which the amount of halogen lower alkyl phosphate is about 25 to 50 weight percent based on the reaction product and the halogen lower alkyl phosphate.

20. The composition of claim 19 in which the dissimilar polyhydric alcohol is selected from the group consisting of pentachlorophenoxy glyceryl ether,
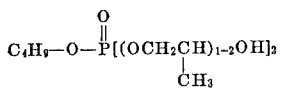
and O,O-diethyl-N,N-bis(2 - hydroxyethyl)aminomethyl phosphonate.
References Cited
UNITED STATES PATENTS
| | | |
|---|---|---|
| 3,037,946 | 6/1962 | Guest et al. |
| 3,141,294 | 7/1964 | Lawrence et al. |
| 3,171,819 | 3/1965 | Powanda. |
DONALD E. CZAJA, *Primary Examiner.*
M. J. WELSH, *Assistant Examiner.*